(12) United States Patent
Liu et al.

(10) Patent No.: US 6,761,974 B1
(45) Date of Patent: Jul. 13, 2004

(54) POLYMERIC LUBRICANTS WITH IMPROVED STABILITY AND THIN FILM RECORDING MEDIA COMPRISING SAME

(75) Inventors: Jianwei Liu, Fremont, CA (US); Michael Joseph Stirniman, Fremont, CA (US); Jing Gui, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/087,979

(22) Filed: Mar. 5, 2002

Related U.S. Application Data
(60) Provisional application No. 60/288,918, filed on May 4, 2001.

(51) Int. Cl.$^7$ .............................................. G11B 5/725
(52) U.S. Cl. ................................ 428/421; 428/694 TF; 508/244; 508/267; 508/582; 427/131
(58) Field of Search ................................ 428/421, 422, 428/694 TF; 427/131; 508/244, 267, 582

(56) References Cited

U.S. PATENT DOCUMENTS

| | | | |
|---|---|---|---|
| 3,696,128 A | * | 10/1972 | Garth .......................... 552/262 |
| 4,153,596 A | * | 5/1979 | Oertel et al. ................. 525/375 |
| 4,260,689 A | * | 4/1981 | Rody et al. .................... 525/55 |
| 4,268,556 A | | 5/1981 | Pedrotty |
| 4,435,187 A | | 3/1984 | Graiff et al. |
| 4,696,845 A | | 9/1987 | Yanagisawa |
| 4,757,145 A | | 7/1988 | Caporiccio et al. |
| 5,000,864 A | | 3/1991 | Strepparola et al. |
| 5,034,525 A | | 7/1991 | Dekura |
| 5,084,195 A | | 1/1992 | Camenzind et al. |
| 5,128,216 A | | 7/1992 | Ng |
| 5,252,400 A | | 10/1993 | Mizuno et al. |
| 5,300,243 A | | 4/1994 | Camenzind et al. |
| 5,453,539 A | | 9/1995 | Kondo et al. |
| 5,498,457 A | | 3/1996 | Ishihara et al. |
| 5,536,425 A | | 7/1996 | Kondo et al. |
| 5,536,578 A | | 7/1996 | Shoji et al. |
| 5,629,440 A | | 5/1997 | Camenzind et al. |
| 5,663,127 A | | 9/1997 | Flynn et al. |
| 5,965,496 A | * | 10/1999 | Yamana et al. .............. 508/244 |
| 5,973,020 A | | 10/1999 | Kerr, III et al. |
| 5,998,119 A | | 12/1999 | Aylward et al. |
| 6,080,534 A | | 6/2000 | Aylward et al. |
| 6,143,413 A | | 11/2000 | Kamei et al. |
| 6,171,751 B1 | | 1/2001 | Mourey et al. |
| 6,194,025 B1 | | 2/2001 | Nimura |
| 6,399,712 B1 | * | 6/2002 | Seto et al. ................. 525/327.1 |

* cited by examiner

*Primary Examiner*—Stevan A. Resan
(74) *Attorney, Agent, or Firm*—McDermott, Will & Emery

(57) ABSTRACT

A data/information storage and retrieval medium, comprising:
(a) a substrate including a layer stack thereon, the layer stack including a surface and at least one magnetic or magneto-optical ("MO") recording layer; and
(b) a thin film or layer of a lubricant formed on the surface of the layer stack, comprised of a derivatized perfluoropolyether compound comprising a generally linear perfluoropolyether chain and at least one Hindered Amine Light Stabilizer ("HALS") moiety at at least one end of the chain.

29 Claims, 1 Drawing Sheet

POLYMERIC LUBRICANTS WITH IMPROVED STABILITY AND THIN FILM RECORDING MEDIA COMPRISING SAME

CROSS-REFERENCE TO PROVISIONAL APPLICATION

This application claims priority from U.S. provisional patent application Ser. No. 60/288,918 filed May 4, 2001, the entire disclosure of which is incorporated herein by reference.

FIELD OF THE INVENTION

The present invention relates to polymeric lubricants having improved chemical stability, and to thin film data/information storage and retrieval media comprising thin films of same as a lubricant topcoat for reducing static and dynamic frictional coefficients of the media when utilized in combination with a flying head read/write transducer. The invention enjoys particular utility in the manufacture and use of thin film type magnetic or magneto-optical ("MO") recording media comprising a stacked plurality of thin film layers formed on a substrate, e.g., a disk-shaped substrate, wherein a thin topcoat layer comprised of a polymeric lubricant is applied to the upper surface of the layer stack for improving tribological performance of the media when utilized with read/write transducer heads operating at very low flying heights.

BACKGROUND OF THE INVENTION

Magnetic and MO media are widely employed in various applications, particularly in the computer industry for data/information storage and retrieval purposes. A magnetic medium in, e.g., disk form, such as utilized in computer-related applications, comprises a non-magnetic disk-shaped substrate, e.g., of glass, ceramic, glass-ceramic composite, polymer, metal, or metal alloy, typically an aluminum (Al)-based alloy such as aluminum-magnesium (Al-Mg), having at least one major surface on which a layer stack or laminate comprising a plurality of thin film layers constituting the medium are sequentially deposited. Such layers may include, in sequence from the substrate deposition surface, a plating layer, e.g., of amorphous nickel-phosphorus (Ni-P), a polycrystalline underlayer, typically of chromium (Cr) or a Cr-based alloy such as chromium-vanadium (CrV), a magnetic layer, e.g., of a cobalt (Co)-based alloy, and a protective overcoat layer, typically of a carbon (C)-based material, e.g., diamond-like carbon ("DLC") having good tribological properties. A similar situation exists with MO media, wherein a layer stack or laminate is formed on a substrate deposition surface, which layer stack or laminate typically comprises a reflective layer, e.g., of a metal or metal alloy, one or more rare-earth thermo-magnetic (RE-TM) alloy layers, one or more transparent dielectric layers, and a protective overcoat layer, e.g., a DLC layer, for functioning as reflective, transparent, writing, writing assist, and read-out layers, etc.

In operation of such disk-shaped magnetic and/or MO media, a typical contact start/stop (CSS) method commences when a data transducing head begins to slide against the surface of the disk as the disk begins to rotate. Upon reaching a predetermined high rotational speed, the head floats in air at a predetermined distance from the surface of the disk, where it is maintained during reading and recording operations. Upon terminating operation of the disk drive, the head again begins to slide against the surface of the disk and eventually stops in contact with and pressing against the disk. Each time the head and disk assembly is driven, the sliding surface of the head repeats the cyclic operation consisting of stopping, sliding against the surface of the disk, floating in the air, sliding against the surface of the disk, and stopping.

For optimum consistency and predictability, it is necessary to maintain each transducer head as close to its associated recording surface as possible, i.e., to minimize the flying height of the head. Accordingly, a smooth recording surface is preferred, as well as a smooth opposing surface of the associated transducer head. However, if the head surface and the recording surface are too flat, the precision match of these surfaces gives rise to excessive stiction and friction during the start up and stopping phases, thereby causing wear to the head and recording surfaces, eventually leading to what is referred to as a "head crash." Thus, there are competing goals of reduced head/disk friction and minimum transducer flying height.

According to conventional practices, a lubricant topcoat is uniformly applied over the protective overcoat layer to prevent wear between the disk and the facing surface of the read/write transducer head during CSS operation because excessive wear of the protective overcoat layer increases friction between the transducer head and the disk, eventually leading to catastrophic failure of the disk drive. However, an excess amount of lubricant at the head-disk interface causes high stiction between the head and the disk, which stiction, if excessive, prevents starting of disk rotation, hence catastrophic failure of the disk drive. Accordingly, the lubricant thickness must be optimized for stiction and friction.

The continuing requirements for increased recording density and faster data transfer rates necessitating lower flying heights of the data transducing heads and friction/stiction of the head-disk interface have served as an impetus for the development of specialized lubricants for serving as the lubricant topcoat layer overlying the protective overcoat layer. Such lubricants are required to fulfill a variety of functions requiring diverse characteristics and attributes. For example, the lubricant material forming the topcoat layer must be chemically inert, have a low vapor pressure, low surface tension, high thermal stability, mechanical stability under shear stress, and good boundary lubrication properties. In addition to the foregoing, it is critical that the lubricant adhere tightly to the underlying surface, i.e., the protective overcoat layer (typically carbon-based) over the lifetime of the disk drive comprising the recording disk and associated flying head data transducer.

Fluoropolyether lubricants have been developed which are in widespread use as materials for forming the lubricant topcoat layers of disk-shaped data/information storage and retrieval media, e.g., magnetic and MO recording media. Fluoropolyether-based lubricants are uniquely suited for use as lubricant topcoat layers in such rotating disk-type recording media in view of their exemplary properties, including inter alia, chemical inertness, low vapor pressure, low surface tension, high thermal stability, mechanical stability under high shear stress, and good boundary lubrication properties. Among the many currently available fluoropolyether lubricants, liquid perfluoropolyethers (PFPE) and derivatives thereof are most commonly employed in forming lubricant topcoat layers on rotatable recording media.

Commercially available PFPE lubricants include KRYTOX™ (DuPont Co., Wilmington, Del.); FOMBLIN™ Z-DOL, Z-TETRAOL, Z-DOL TXS, AM 2001, and AM 3001 (Ausimont Montedison Group, Thorofare, N.J.); and DEMNUM™ SA, SH, SP, and SY (Daikin Industries, Ltd., Osaka, Japan). A number of these commercially available PFPE-based lubricants are substituted with 2 to 4 polar end-groups, such as 2–4 hydroxyl or carboxyl groups, which polar end-groups are provided for enhancing adhesion of the polymeric lubricant molecules to the surface of the recording media, e.g., the surface of a carbon-based protective overcoat layer. Application of the PFPE-based lubricants to the media surface may be performed by any standard technique, e.g., dipping, spraying, spin coating, etc., followed by drying to remove any volatile solvent(s) therefrom, and if desired, followed by tape burnishing. A more recently developed technique for applying thin films of polymeric lubricants to media surfaces comprises generation of a vapor of the lubricant followed by condensation of the vapor on the media surface.

As indicated above, conventional PFPE-based lubricants generally comprise 2–4 polar groups or moieties at either end of a generally linear perfluorinated alkylpolyether molecule, for facilitating direct bonding to a surface, and thus, provide improved adhesion of the lubricant topcoat layer to the surface of the protective overcoat layer. Such polar functional groups, however, are not necessarily chemically inert, i.e., they may exhibit varying degrees of chemical inertness, and consequently, the above-described conventional PFPE-based lubricants may disadvantageously undergo chemical reactions prior or subsequent to their application to the media surface. In particular, contamination of the lubricant topcoat layer with a Lewis acid, e.g., aluminum oxide ($Al_2O_3$), may promote rapid degradation of the lubricant topcoat layer.

As a consequence of such concerns and problems associated with the chemical stability of derivatized PFPE lubricant materials utilized as topcoat layers in rotatable disk recording media, decomposition resistance of the lubricant is an important criterion in lubricant selection, particularly resistance against acid-catalyzed decomposition.

One approach which has been investigated for mitigating the problem of acid-catalyzed lubricant decomposition of PFPE-based lubricants is to include a small amount of a "Hindered Amine Light Stabilizer" ("HALS") compound to the solution utilized for applying the lubricant topcoat layer by dipping techniques. However, addition of a HALS compound to solutions of conventional PFPE lubricants and derivatives thereof incurs a number of problems and drawbacks, including inter alia, phase separation, hazing, and decreased tribological performance. Further, the very low solubility of the HALS compound in the PFPE molecules results in incorporation of a very amount of the HALS compound in the lubricant topcoat layer, and as a consequence, the effect on protecting the PFPE-based lubricant molecules from chemical reaction, e.g., acid-catalyzed decomposition, is negligible.

Thus, a significant factor in evaluating the performance of candidate lubricant materials for use as lubricant topcoat layers in rotatable recording media is the ability of the lubricant to resist chemical decomposition over time, particularly acid-catalyzed decomposition. In view of the criticality of the lubricant topcoat in obtaining and maintaining optimum performance of rotating disk recording media utilized with flying head read/write transducers operating at very low flying heights, there is a continuing need for lubricant materials and topcoat layers exhibiting improved chemical and physical durability, adhesion, stiction and wear performance, etc., particularly under conditions of high stress, temperature, and humidity.

DISCLOSURE OF THE INVENTION

An advantage of the present invention is a lubricant composition having improved stability.

Another advantage of the present invention is a data/information storage retrieval medium including a lubricant topcoat layer having improved stability.

Yet another advantage of the present invention is a method of manufacturing a data/information storage retrieval medium including a lubricant topcoat layer having improved stability.

Still another advantage of the present invention is a method of synthesizing a lubricant compound having improved stability.

A further advantage of the present invention is an improved data/information storage retrieval medium.

Additional advantages and other aspects and features of the present invention will be set forth in the description which follows and in part will become apparent to those having ordinary skill in the art upon examination of the following or may be learned from the practice of the present invention. The advantages of the present invention may be realized and obtained as particularly pointed out in the appended claims.

According to an aspect of the present invention, the foregoing and other advantages are obtained in part by a lubricant composition comprising a derivatized perfluoropolyether compound including a generally linear perfluoropolyether chain and at least one Hindered Amine Light Stabilizer ("HALS") moiety at at least one end of the chain.

According to certain embodiments of the present invention, the lubricant composition comprises at least one said HALS moiety at each end of the generally linear perfluoropolyether chain.

In accordance with embodiments of the present invention, the at least one HALS moiety is attached to the at least one end of the generally linear perfluoropolyether chain via a chemical bond between a reactive group at the at least one end of the chain and a reactive group of the HALS moiety.

According to particular embodiments of the present invention, the at least one HALS moiety is a piperidine derivative having a reactive group selected from amino (—$NH_2$), hydroxyl (—OH), carboxylic ester (—COOR), and carboxylic chloride (—COCl) groups; e.g., the piperidine derivative is a 2,6-tetramethyl-piperidine and the reactive group is at the 4-position thereof; and according to particular embodiments of the present invention, the generally linear perfluoropolyether chain comprises a plurality of —$(C_xF_{2x}O)_n$— repeating units, wherein x in each unit is independently an integer from 1 to about 10 and n is an integer from about 10 to about 30, and the generally linear perfluoropolyether chain comprises at least one reactive group selected from ester (—COOR), alcohol (—COH), carboxylic acid (—COOH), and carboxylic chloride (—COCl) groups at the at least one end of said chain.

Further embodiments of the present invention include lubricant compositions comprising the derivatized perfluoropolyether compound in a solvent therefor.

Another aspect of the present invention is a data/information storage and retrieval medium, comprising:
  (a) a substrate including a layer stack thereon, the layer stack including a surface and at least one magnetic or magneto-optical ("MO") recording layer; and
  (b) a thin film or layer of a lubricant formed on the surface, comprised of a derivatized perfluoropolyether compound including a generally linear perfluoropolyether chain and at least one Hindered Amine Light Stabilizer ("HAS") moiety at at least one end of the chain.

According to certain embodiments of the present invention, the derivatized perfluoropolyether compound includes the generally linear perfluoropolyether chain and a HALS moiety at each end thereof.

In accordance with embodiments of the present invention, the at least one HALS moiety is attached to the at least one end of the generally linear perfluoropolyether chain via a chemical bond between a reactive group at the at least one end of said chain and a reactive group of the HALS moiety.

According to particular embodiments of the present invention, the at least one HALS moiety is a piperidine derivative having a reactive group selected from amino (—NH₂), hydroxyl (—OH), carboxylic ester (—COOR), and carboxylic chloride (—COCl) groups, e.g., the piperidine derivative is 2,6-tetramethyl-piperidine and the reactive group is at the 4-position thereof.

In accordance with embodiments of the present invention, the generally linear perfluoropolyether chain comprises a plurality of —$(C_xF_{2x}O)_n$— repeating units, wherein x in each unit is independently an integer from 1 to about 10 and n is an integer from about 10 to about 30; and the generally linear perfluoropolyether chain comprises at least one reactive group selected from ester (—COOR), alcohol (—COH), carboxylic acid (—COOH), and carboxylic chloride (—COCl) groups at the at least one end of the chain.

According to further embodiments of the present invention, the substrate (a) is disk-shaped and the surface of the layer stack comprises a carbon (C)-based protective overcoat material.

Yet another aspect of the present invention is a method of manufacturing a data/information storage retrieval medium, comprising steps of:
  (a) providing a substrate including a layer stack thereon, the layer stack including a surface and at least one magnetic or magneto-optical ("MO") recording layer; and
  (b) forming a thin film or layer of a lubricant on the surface of the layer stack, comprised of a derivatized perfluoropolyether compound including a generally linear perfluoropolyether chain and at least one Hindered Amine Light Stabilizer ("HALS") moiety at at least one end of the chain.

According to certain embodiments of the present invention, step (b) comprises forming a thin film or layer of a lubricant comprised of the derivatized perfluoropolyether compound including the generally linear perfluoropolyether chain and a HALS moiety at each end thereof.

In accordance with embodiments of the present invention, step (b) comprises forming a thin film or layer of a lubricant comprised of the derivatized perfluoropolyether compound wherein the at least one HALS moiety is attached to the at least one end of the generally linear perfluoropolyether chain via a chemical bond between a reactive group at the at least one end of the chain and a reactive group of the HALS moiety.

According to particular embodiments of the present invention, step (b) comprises forming a thin film or layer of a lubricant comprised of the derivatized perfluoropolyether compound wherein the at least one HALS moiety is a piperidine derivative having a reactive group selected from amino (—NH₂), hydroxyl (—OH), carboxylic ester (—COOR), and carboxylic chloride (—COCl) groups, e.g., the piperidine derivative is a 2,6-tetramethyl-piperidine and the reactive group is at the 4-position thereof.

In accordance with embodiments of the present invention, step (b) comprises forming a thin film or layer of a lubricant comprised of a derivatized perfluoropolyether compound including a generally linear perfluoropolyether chain comprised of a plurality of —$(C_xF_{2x}O)_n$— repeating units, wherein x in each unit is independently an integer from 1 to about 10 and n is an integer from about 10 to about 30; wherein step (b) comprises forming a thin film or layer of a lubricant comprised of a derivatized perfluoropolyether compound including a generally linear perfluoropolyether chain comprising at least one reactive group selected from ester (—COOR), alcohol (—COH), carboxylic acid (—COOH), and carboxylic chloride (—COCl) groups at the at least one end of the chain.

According to particular embodiments of the present invention, step (a) comprises providing a disk-shaped substrate and the surface of the layer stack comprises a carbon (C)-based protective overcoat material; and in accordance with further embodiments of the present invention, step (b) comprises submerging the substrate with the layer stack thereon in a solution comprising the derivatized perfluoropolyether compound in a solvent and withdrawing the substrate with the layer stack thereon from the solution to form the thin film or layer of the lubricant on the surface of the layer stack.

Still another aspect of the present invention is a method of synthesizing a derivatized perfluoropolyether compound useful as a lubricant stabilized against Lewis acid-catalyzed decomposition when utilized as a thin film lubricant layer of a thin film data/information storage and retrieval media, comprising steps of:
  (a) providing a precursor perfluoropolyether compound including a generally linear perfluoropolyether chain having at least one reactive group at at least one end of the chain; and
  (b) reacting the at least one reactive group of the precursor compound with a reactive group of a Hindered Amine Light Stabilizer ("HALS") compound to form a generally linear derivatized perfluoropolyether compound having a HALS moiety at the at least one end of the chain.

According to certain embodiments of the present invention, step (b) comprises reacting a reactive group at each end of the precursor compound with a reactive group of a HALS compound to form a generally linear derivatized perfluoropolyether compound having a HALS moiety at each end of the chain.

In accordance with embodiments of the present invention, step (a) comprises providing a precursor perfluoropolyether compound including a generally linear perfluoropolyether chain having at least one reactive group selected from ester (—COOR), alcohol (—COH), carboxylic acid (—COOH), and carboxylic chloride (—COCl) groups at the at least one end of the chain; and step (b) comprises reacting the at least one reactive group of the precursor with a HALS compound comprising a reactive group selected from amino (—NH$_2$), hydroxyl (—OH), carboxylic ester (—COOR), and carboxylic chloride (—COCl) groups.

According to particular embodiments of the present invention, step (a) comprises providing a precursor perfluoropolyether compound having a generally linear chain comprised of a plurality of —(C$_x$F$_{2x}$O)$_n$— repeating units, wherein x in each unit is independently an integer from 1 to about 10 and n is an integer from about 10 to about 30; and step (b) comprises reacting the at least one reactive group of the precursor compound with a HALS compound in the form of a 2,6-tetramethyl-piperidine with the reactive group thereof at the 4-position.

A still further aspect of the present invention is a data/information storage and retrieval medium, comprising:

(a) a substrate including a layer stack thereon, the layer stack including a surface and at least one magnetic or magneto-optical ("MO") recording layer; and (b) chemically stabilized means for lubricating the surface of the layer stack.

Additional advantages and aspects of the present invention will become readily apparent to those skilled in the art from the following detailed description, wherein embodiments of the present invention are shown and described, simply by illustration of the best mode contemplated for practicing the present invention. As will be described, the present invention is capable of other and different embodiments, and its several details are susceptible of modification in various obvious respects, all without departing from the spirit of the present invention. Accordingly, the drawings and description are to be regarded as illustrative in nature, and not as limitative.

BRIEF DESCRIPTION OF THE DRAWINGS

The following detailed description of the embodiments of the present invention can best be understood when read in conjunction with the following drawings, wherein.

DESCRIPTION OF THE INVENTION

Figure 1:
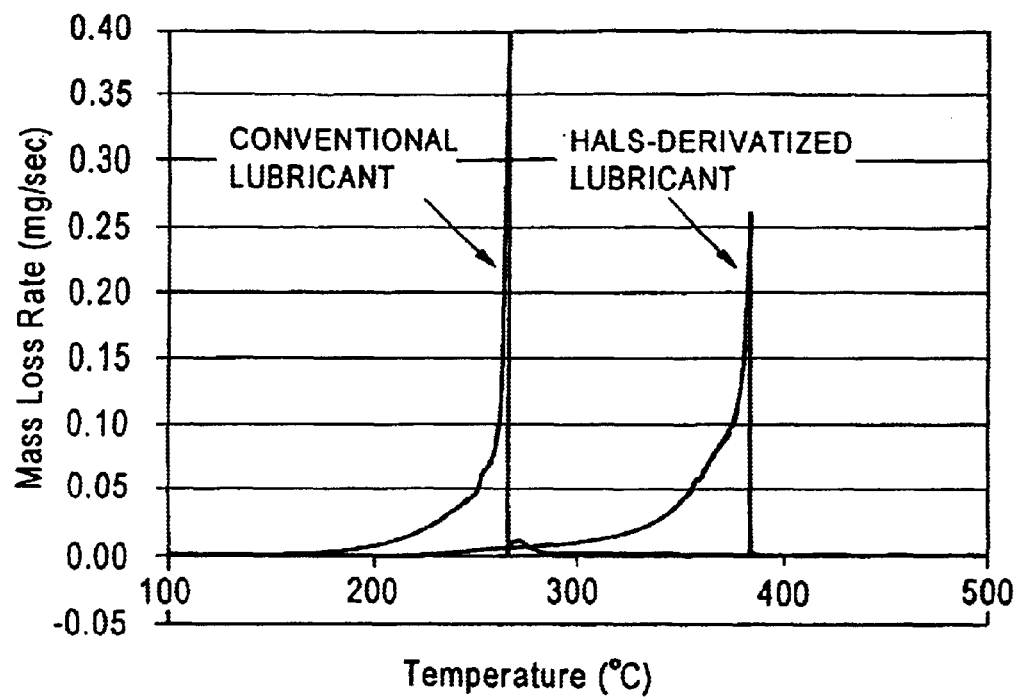
FIG. 1 is a graph for comparing the mass loss rate of a conventional linear perfluoropolyether lubricant and a HALS-derivatized perfluoropolyether lubricant according to the invention, in the presence of Al$_2$O$_3$ decomposition catalyst.

The present invention is based upon the discovery by the present inventors that the above-described problems, difficulties, and drawbacks associated with the use of conventional perfluoropolyether-based lubricant materials in the manufacture and use of thin film magnetic and/or MO recording media, e.g., hard disks, arising from the incomplete chemical inertness thereof disadvantageously resulting in chemical decomposition reactions prior or subsequent to their application to the media surface, particularly in the presence of a Lewis acid, e.g., Al$_2$O$_3$, can be eliminated, or at least substantially mitigated, by forming and utilizing derivatized, generally linear chain perfluoropolyether-based lubricant materials comprising at least one Hindered Amine Light Stabilizer ("HALS") moiety at at least one end of the chain.

The inventive methodology, wherein derivatized perfluoropolyether-based lubricant materials comprising at least one Hindered Amine Light Stabilizer ("HALS") moiety within the lubricant molecules rather than in admixture therewith (i.e., as an additive to the lubricant solution applied to the media surface), advantageously overcomes the difficulties, disadvantages, and drawbacks associated with the latter approach, including inter alia, phase separation when the lubricant layer is very thin, i.e., less than a monolayer thick, hazing, and decreased head flyability and tribological performance. Moreover, the derivatized perfluoropolyether-based lubricant materials comprising at least one HALS moiety according to the present invention are easily synthesized from readily available, generally linear perfluoropolyether-based precursor materials having at least one reactive group at at least one end thereof and from readily available HALS compounds or derivatives thereof which include a reactive group for reaction with the reactive end group(s) of the perfluoropolyether-based precursor materials. In addition, the derivatized perfluoropolyether-based lubricant materials comprising at least one HALS moiety according to the present invention can be applied as thin lubricant topcoat layers of thin film magnetic and/or MO recording media by means of conventional techniques and methodologies, e.g., dipping into a solution of the derivatized lubricant materials in a suitable solvent, and they exhibit friction and stiction characteristics comparable to those of conventional perfluoropolyether-based lubricant materials.

According to the present invention, therefore, stability of perfluoropolyether-based lubricants utilized in the manufacture and use of thin film magnetic and/or MO recording media in disk form, particularly against acid-catalyzed catalytic composition (as in the presence of a Lewis acid, such as Al$_2$O$_3$), is significantly improved by synthetic attachment of at least one Hindered Amine Light Stabilizer ("HALS") moiety to at least one end of a generally linear chain perfluoropolyether compound ("precursor compound"). As utilized herein and elsewhere (see, e.g., U.S. Pat. Nos. 6,171,751 B1; 5,998,119; and 5,973,020, the disclosures of which are incorporated herein by reference thereto), HALS compounds include hindered amine compounds based upon 2,2,6,6-tetramethyl piperidine, and the term Hindered Amine Light Stabilizer is accepted to be used for indicating such hindered amines, their derivatives, and analogues.

According to preferred embodiments of the present invention, the tetramethyl piperidine derivatives utilized as the HALS moiety comprise a reactive group at the 4-position, selected from among amino (—$NH_2$), hydroxyl (—OH), carboxylic ester (—COOR), and carboxylic chloride (—COCl) groups, which derivatives of tetramethyl piperidine are commercially available or readily prepared according to conventional synthetic practices.

Generally linear perfluoropolyether compounds usable as precursor compounds according to the invention comprise a plurality of —$(C_xF_{2x}O)_n$— repeating units, wherein x in each unit is independently an integer from 1 to about 10 and n is an integer from about 10 to about 30, with at least one reactive group selected from ester (—COOR), alcohol (—COH), carboxylic acid (—COOH), and carboxylic chloride (—COCl) groups at at least one end of the chain. Several such precursor compounds including these reactive end groups and suitable for use according to the invention are available from Ausimont Moritedison Group, Thorofare, N.J. and include Z-Deal (with—COOR end groups), Z-Dol (with—COH groups), and Z-Diac (with—COOH end groups). The perfluoropolyether derivatives with carboxylic chloride (—COCl) end groups for use as precursor compounds according to the present invention are readily prepared from Z-Diac according to conventional synthetic practices.

According to the invention, HALS-derivatized perfluoropolyether compounds are synthesized by effecting reaction between the reactive end group(s) of the precursor compound and the reactive group (substituent) of the HALS compound. By way of illustration only, reaction of Z-Deal as a precursor compound comprising ester (—COOR) groups as reactive end groups with a HALS compound comprising a reactive amino (—$NH_2$) group forms a derivatized perfluoropolyether compound including at least one HALS moiety attached via an amide linkage to at least one end of the perfluoropolyether chain. Reaction between the precursor and HALS compounds to form the HALS-derivatized perfluoroplyether compound is readily accomplished, as by refluxing a mixture of solutions of each constituent in appropriate solvents, followed by separation therefrom of the desired reaction product, as by conventional techniques.

Thin lubricant films of the HALS-derivatized perfluoropolyether compounds according to the invention can be applied to the upper surface of thin film magnetic and/or MO recording media, typically in disk form and comprising an uppermost C-based protective overcoat layer, by any conventional technique, e.g., submerging the disk in a solution comprising the derivatized perfluoropolyether compound in a suitable solvent, withdrawing the disk from the solution, and evaporating the solvent therefrom to form a thin film or layer of the HALS-derivatized lubricant on the surface of the protective overcoat layer.

HALS end-capped, derivatized perfluoropolyethers synthesized according to the present invention exhibit excellent resistance to catalytic decomposition, as determined by thermogravimetric analysis ("TGA"). For example, conventional, non-HALS-derivatized perfluoropolyether lubricants rapidly decompose in the presence of a Lewis acid catalyst, e.g., $Al_2O_3$, at about 260° C., whereas HALS-derivatized perfluoropolyethers according to the invention remain stable at temperatures up to about 370° C. In addition, the HALS moiety of the HALS-derivatized perfluoropolyethers according to the invention stabilizes the carbon-based protective overcoat layers of the thin film magnetic and MO media when applied thereto as thin lubricant topcoat layers, while at the same time exhibiting stiction and friction characteristics comparable to those of conventional, non-HALS-derivatized perfluoropolyether lubricants.

EXAMPLE

A HALS-derivatized perfluoropolyether lubricant compound comprising a generally linear perfluoropolyether chain with 2,2,4,4-tetramethyl piperidine HALS moieties attached to both ends thereof via an amide linkage was prepared as follows: Z-Deal lubricant (Ausimont), comprising a generally linear chain perfluoropolyether compound with—$COOCH_3$ ester groups at both ends of the chain, was pre-fractionated to a narrower MW distribution, i.e., from about 2,000 to about 5,000 Daltons. 10 gms. (5 mmol.) of the pre-fractionated Z-Deal were dissolved with magnetic stirring in a 50 ml round-bottom flask containing 20 ml of $C_5H_2F_{10}$ solvent (Vertrel XF, Dupont Co.), to which was added a solution of 2.34 gms. (15 mmol.) of a HALS compound with a reactive amino (—$NH_2$) group, i.e., 4-amino-2,2,6,6-tetramethyl piperidine in 10 ml of methanol, followed by refluxing of the mixture for 48 hrs. The resulting solution was cooled, washed with dilute HCl, and diluted with 100 ml Vertrel XF. The Vertrel XF was then evaporated and the resultant subjected to a further supercritical fluid extraction to yield 9 gms (90% yield) of a clear fluid product (HALS-derivatized perfluoropolyether).

Thermogravimetric (TGA) studies of the catalytic decomposition in the presence of $Al_2O_3$ powder of the thus-prepared derivatized perfluoropolyether end-capped with the 2,2,6,6-tetramethyl piperidine HALS moiety via an amide linkage and un-derivatized perfluoropolyether are shown in the graph of FIG. 1 as a function of temperature. The sharp rise in the mass loss rate for the un-derivatized perfluoropolyether at about 260° C. is due to catalytic decomposition of the —$(C_xF_{2x}O)_n$— main chain, which catalytic decomposition occurs at a significantly higher temperature, i.e., about 370° C., for the HALS end-capped perfluoropolymer, indicating a corresponding significant increase in stability against catalytic decomposition vis-a-vis the conventional, un-derivatized perfluoropolyether lubricant.

Figure 2:
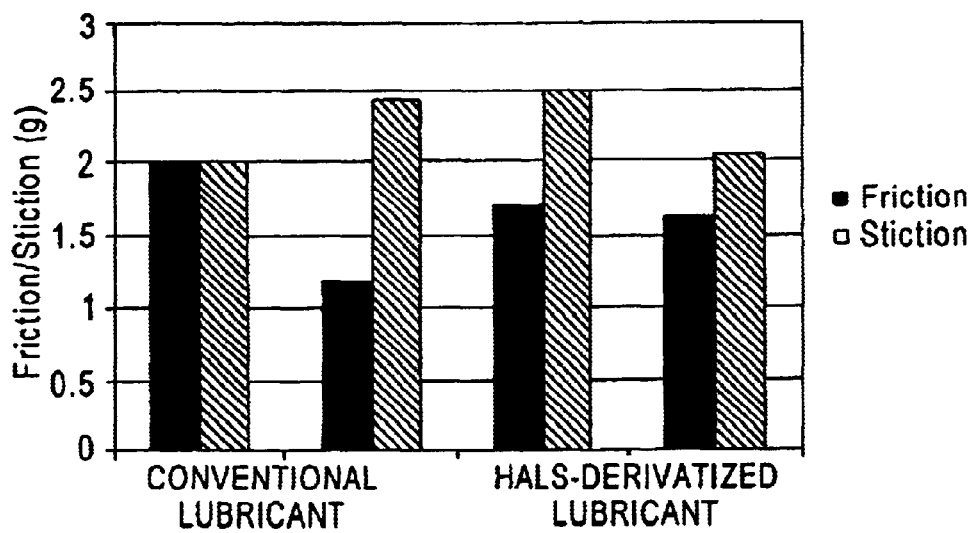
FIG. 2 is a graph for comparing the friction and stiction characteristics of a conventional linear perfluoropolyether lubricant and a HALS-derivatized perfluoropolyether lubricant according to the invention.

Thin lubricant films of the HALS end-capped perfluoropolymer formed on carbon-based protective overcoat layers of disk-shaped, thin film magnetic and MO media by conventional dipping techniques (described supra) typically exhibited bonded lube ratios of about 65% and water contact angles ("WCA") of about 84.5°, comparable to those of conventional perfluoropolyether-based lubricants. Durability of lubricant films comprising the HALS end-capped perfluoropolyether under Contact-Stop-Start operating conditions ("CSS") was satisfactory; and as is evident from FIG. 2, the friction and stiction characteristics of thin lubricant films of the HALS end-capped perfluoropolyether are comparable to those of conventional perfluoropolyether-based lubricants.

The present invention thus provides a number of advantages over conventional methodology utilizing conventional perfluoropolyether-based lubricant films utilized in the manufacture and use of disk-shaped, thin film magnetic and/or MO recording media, and is of particular utility in automated manufacturing processing of thin film magnetic and MO recording media requiring formation of stable and durable lubricant topcoat layers for obtaining improved tribological properties. Specifically, the present invention provides for significantly increased stability and resistance of the lubricant topcoat layer to Lewis acid-catalyzed decomposition, compared to conventional perfluoropolyether-based lubricant thin films. Further, the inventive methodology can be readily practiced and utilized as part of conventional recording media manufacturing technology in view of its full compatibility with all other aspects of automated manufacture of disk-shaped magnetic and MO media. Finally, the inventive methodology is broadly applicable to the manufacture of a number of different products, e.g., mechanical parts, gears, linkages, etc., requiring lubrication.

In the previous description, numerous specific details are set forth, such as specific materials, structures, processes, etc., in order to provide a better understanding of the present invention. However, the present invention can be practiced without resorting to the details specifically set forth. In other instances, well-known processing materials, structures, and techniques have not been described in detail in order not to unnecessarily obscure the present invention.

Only the preferred embodiments of the present invention and but a few examples of its versatility are shown and described in the present invention. It is to be understood that the present invention is capable of use in various other embodiments and is susceptible of changes and/or modifications within the scope of the inventive concept as expressed herein.

What is claimed is:

1. A lubricant composition comprising a derivatized perfluoropolyether compound including a generally linear perfluoropolyether chain and at least one Hindered Amine Light Stabilizer ("HALS") moiety at at least one end of said chain, wherein said at least one HALS moiety is a piperidine derivative having a hydrogen atom at the 1-position and a reactive group at the 4-position thereof.

2. The lubricant composition as in claim 1, comprising at least one said HALS moiety at each end of said generally linear perfluoropolyether chain.

3. The lubricant composition as in claim 1, wherein said at least one HALS moiety is attached to said at least one end of said generally linear perfluoropolyether chain via a chemical bond between a reactive group at said at least one end of said chain and a reactive group of said HALS moiety.

4. The lubricant composition as in claim 3, wherein said reactive group of said at least one HALS moiety is selected from amino (—$NH_2$), hydroxyl (—OH), carboxylic ester, and carboxylic chloride (—COCl) groups.

5. The lubricant composition as in claim 4, wherein said piperidine derivative is a 2,6-tetramethyl-piperidine.

6. The lubricant composition as in claim 3, wherein said generally linear perfluoropolyether chain comprises a plurality of —$(C_xF_{2x}O)_n$— repeating units, wherein x in each unit is independently an integer from 1 to about 10 and n is an integer from about 10 to about 30.

7. The lubricant composition as in claim 6, wherein said generally linear perfluoropolyether chain comprises at least one reactive group selected from ester, alcohol (—COH), carboxylic acid (—COOH), and carboxylic chloride (—COCl) groups at said at least one end of said chain.

8. The lubricant composition as in claim 1, further comprising a solvent for said derivatized perfluoropolyether compound.

9. A data/information storage and retrieval medium, comprising:
    (a) a substrate including a layer stack thereon, said layer stack including a surface and at least one magnetic or magneto-optical ("MO") recording layer; and
    (b) a thin film or layer of a lubricant formed on said surface, comprised of a derivatized perfluoropolyether compound including a generally linear perfluoropolyether chain and at least one Hindered Amine Light Stabilizer ("HALS") moiety at at least one end of said chain, wherein said at least one HALS moiety is a piperidine derivative having a hydrogen atom at the 1-position and a reactive group at the 4-position thereof.

10. The medium according to claim 9, wherein:
    said derivatized perfluoropolyether compound includes said generally linear perfluoropolyether chain and a said HALS moiety at each end thereof.

11. The medium according to claim 9, wherein said at least one HALS moiety is attached to said at least one end of said generally linear perfluoropolyether chain via a chemical bond between a reactive group at said at least one end of said chain and a reactive group of said HALS moiety.

12. The medium according to claim 11, wherein said a reactive group of said at least one HALS moiety is selected from amino (—$NH_2$), hydroxyl (—OH), carboxylic ester, and carboxylic chloride (—COCl) groups.

13. The medium according to claim 12, wherein said piperidine derivative is 2,6-tetramethyl-piperidine.

14. The medium according to claim 11, wherein said generally linear perfluoropolyether chain comprises a plurality of —$(C_xF_{2x}O)_n$— repeating units, wherein x in each unit is independently an integer from 1 to about 10 and n is an integer from about 10 to about 30.

15. The medium according to claim 14, wherein said generally linear perfluoropolyether chain comprises at least one reactive group selected from ester, alcohol (—COH), carboxylic acid (—COOH), and carboxylic chloride (—COCl) groups at said at least one end of said chain.

16. The medium according to claim 9, wherein said substrate (a) is disk-shaped and said surface of said layer stack comprises a carbon (C)-based protective overcoat material.

17. A method of manufacturing a data/information storage retrieval medium, comprising steps of:
    (a) providing a substrate including a layer stack thereon, said layer stack including a surface and at least one magnetic or magneto-optical ("MO") recording layer; and (b) forming a thin film or layer of a lubricant on said surface of said layer stack, comprised of a derivatized perfluoropolyether compound including a generally linear perfluoropolyether chain and at least one Hindered Amine Light Stabilizer ("HALS") moiety at at least one end of said chain, wherein said at least one HALS moiety is a piperidine derivative having a hydrogen at the 1-position and a reactive group at the 4-position thereof.

18. The method according to claim 17, wherein:

step (b) comprises forming a thin film or layer of a lubricant comprised of said derivatized perfluoropolyether compound including said generally linear perfluoropolyether chain and a said HALS moiety at each end thereof.

19. The method according to claim 17, wherein:

step (b) comprises forming a thin film or layer of a lubricant comprised of said derivatized perfluoropolyether compound wherein said at least one HALS moiety is attached to said at least one end of said generally linear perfluoropolyether chain via a chemical bond between a reactive group at said at least one end of said chain and a reactive group of said HALS moiety.

20. The method according to claim 19, wherein:

step (b) comprises forming a thin film or layer of a lubricant comprised of said derivatized perfluoropolyether compound wherein said reactive group of said HALS moiety is selected from amino (—$NH_2$), hydroxyl (—OH), carboxylic ester, and carboxylic chloride (—COCl) groups.

21. The method according to claim 20, wherein said piperidine derivative is a 2,6-tetramethyl-piperidine.

22. The method according to claim 19, wherein:

step (b) comprises forming a thin film or layer of a lubricant comprised of a derivatized perfluoropolyether compound including a generally linear perfluoropolyether chain comprised of a plurality of —$(C_xF_2O)_n$— repeating units, wherein x in each unit is independently an integer from 1 to about 10 and n is an integer from about 10 to about 30.

23. The method according to claim 22, wherein:

step (b) comprises forming a thin film or layer of a lubricant comprised of a derivatized perfluoropolyether compound including a generally linear perfluoropolyether chain comprising at least one reactive group selected from ester, alcohol (—COH), carboxylic acid (—COOH), and carboxylic chloride (—COCl) groups at said at least one end of said chain.

24. The method according to claim 17, wherein:

step (a) comprises providing a disk-shaped substrate and said surface of said layer stack comprises a carbon (C)-based protective overcoat material.

25. The method according to claim 17, wherein:

step (b) comprises submerging said substrate with said layer stack thereon in a solution comprising said derivatized perfluoropolyether compound in a solvent and withdrawing said substrate with said layer stack thereon from said solution to form said thin film or layer of said lubricant on said surface of said layer stack.

26. A method of synthesizing a derivatized perfluoropolyether compound useful as a lubricant stabilized against Lewis acid-catalyzed decomposition when utilized as a thin film lubricant layer of a thin film data/information storage and retrieval media, comprising steps of:

(a) providing a precursor perfluoropolyether compound including a generally linear perfluoropolyether chain having at least one reactive group at at least one end of said chain; and (b) reacting said at least one reactive group of said precursor compound with a reactive group of a Hindered Amine Light Stabilizer ("HALS") compound to form a generally linear derivatized perfluoropolyether compound having a HALS moiety at said at least one end of said chain, wherein said at least one HALS moiety is a piperidine derivative having a hydrogen at the 1-position and a reactive group at the 4-position thereof.

27. The method according to claim 26, wherein:

step (b) comprises reacting a reactive group at each end of said precursor compound with a reactive group of a said HALS compound to form a generally linear derivatized perfluoropolyether compound having a said HALS moiety at each end of said chain.

28. The method according to claim 26, wherein:

step (a) comprises providing a precursor perfluoropolyether compound including a generally linear perfluoropolyether chain having at least one reactive group selected from ester, alcohol (—COH), carboxylic acid (—COOH), and carboxylic chloride (—COCl) groups at said at least one end of said chain; and step (b) comprises reacting said at least one reactive group of said precursor with a reactive group of said HALS moiety, wherein the reactive group of said HALS compound is selected from amino (—$NH_2$), hydroxyl (—OH), carboxylic ester, and carboxylic chloride (—COCl) groups.

29. The method according to claim 28, wherein:

step (a) comprises providing a precursor perfluoropolyether compound having a generally linear chain comprised of a plurality of —$(C_xF_{2x}O)_n$— repeating units, wherein x in each unit is independently an integer from 1 to about 10 and n is an integer from about 10 to about 30;

step (b) comprises reacting said at least one reactive group of said precursor compound with a reactive group of said piperidine derivative, wherein said piperidine derivative is 2,6-tetramethyl-piperidine.

* * * * *